Figure 1:
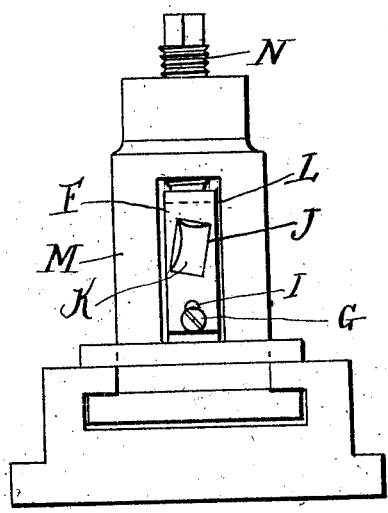

J. G. BAKER.
LATHE TOOL HOLDER.
APPLICATION FILED APR. 6, 1911.

1,011,716.

Patented Dec. 12, 1911.

Witnesses
Francis Alcock
M. E. Yost.

Inventor
Joseph G. Baker

By
H. H. Williamson
Attorney

UNITED STATES PATENT OFFICE.

JOSEPH G. BAKER, OF VINELAND, NEW JERSEY.

LATHE TOOL-HOLDER.

1,011,716.  Specification of Letters Patent.  Patented Dec. 12, 1911.

Application filed April 6, 1911. Serial No. 619,304.

*To all whom it may concern:*

Be it known that I, JOSEPH G. BAKER, a citizen of the United States, residing at Vineland, in the county of Cumberland and State of New Jersey, have invented a certain new and useful Improvement in Lathe Tool-Holders, of which the following is a specification.

My invention relates to new and useful improvements in lathe tool holders and has for its object to provide an exceedingly simple and effective device of this character which will grip and hold different kinds of tools, such as right and left hand side tools and turning tools which are to be used in a tool post of a lathe, planers or shapers.

The device will be quite inexpensive in the cost of manufacture and of very few parts, so that there will be very little to get out of order, will be strong and durable and will be long-lived.

Another object of the invention is to provide a tool holder formed of two principal parts, fastened together and so constructed as to give the proper pitch to the tool and also to give the proper clearance between the tool and the work and permit the use of tools made from different sizes of steel.

A still further object of the invention is to produce a lathe tool holder which will grip the tool throughout the greater portion of its length with the exception of the cutting edge, said tool holder to be clamped upon the tool so that said tool will be held firmly in place by the pressure of the clamping screw, carried by the tool post of the lathe and by gripping the tool for approximately its entire length said tool will be prevented from moving or chattering while being used, thereby accomplishing more accurate and perfect work than with the ordinary tool holder.

A still further object of the invention is to provide a simple and inexpensive tool which may be readily inserted and held in my improved tool holder.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 2:
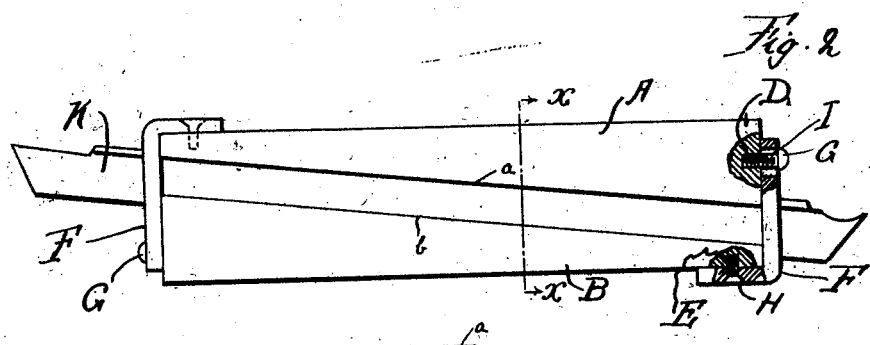
Figure 4:
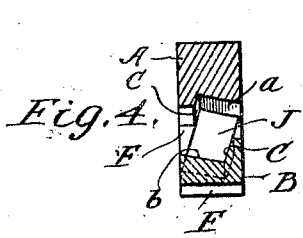

Figure 1, is an end view of my improved tool holder and tool, showing them clamped in the tool post of a lathe. Fig. 2, a side elevation of the tool holder of the tool, and Fig. 3, an end view of the tool holder, one of the fastening members being removed. Fig. 4, a section at the line $x$—$x$ of Fig. 2, looking in the direction of the arrow.

Figure 3:
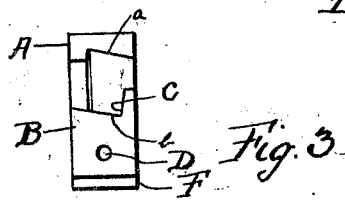

In carrying out my invention as here embodied, A and B represent two sections of my improved tool holder, each of said sections having its inner face formed at an angle to their outer faces, as indicated by $a$ and $b$, thus producing two tri-angular sections as clearly shown in Fig. 2, and in the inner faces of these sections is formed a groove C which is laterally produced at an angle to the side faces of the sections as clearly shown in Fig. 3.

In the larger end of each section is formed a longitudinal screw receiving opening D and in the outer faces at the smaller ends of each of these sections is produced a vertical screw receiving opening E.

F denotes the attaching members, each consisting of an L-shaped plate, the longer leg of which rests against the ends of the sections and are held in place by the screws G and H. The screw G passing through a slot I in the longer leg of the attaching members and into the screw receiving hole D in the larger end of the sections. While the screw H passes through the shorter leg of the attaching members into the vertical screw receiving opening E.

In each of the attaching members is formed an aperture J, the side walls of which are at an angle to the edges of the attaching members, so that said aperture corresponds with the space between the inner faces of the sections, thus permitting the tool K to pass through the apertures into the space between the section for clamping in position. The aperture J is to be made so as to give the greatest adjustment between the sections permitted by the slot I. The tool K is produced from a rectangular bar of metal, generally square in cross section and because of the lateral angle of the slot C it is unnecessary to grind the tool to produce a clearance between the lower edge of the tool and the work, while the longitudinal pitch of the groove gives the desired pitch to the tool.

Thus a tool is produced for this tool holder which will be inexpensive because of the small amount of work required to form it. After the tool has been placed in the holder the tool holder is then slipped into the lathe tool post M, and held in place by the clamp screw N, the inner end of which jams against the outer face of the upper section, forcing it downward and securely clamping the tool between the two sections the entire length of the holder.

A tool holder made in this manner is reversible and invertible to accommodate both right and left hand tools, and each tool to be used in the holder may be double ended, each end having a right or left hand cutting edge, or one end may have a right hand cutting edge while the other has a left hand cutting edge, or both ends may be the same, if desired.

Of course I do not wish to be limited to the exact details of construction as here shown, as these may be varied within the limits of the appended claims without departing from the spirit of my invention.

Having thus fully described my invention, what I claim as new and useful, is—

1. A tool holder comprising two triangular sections, the inner faces of which are formed at an angle to the side faces of said sections, and means for holding said sections together in order that a tool may be clamped between the inner faces.

2. A tool holder comprising two triangular sections, each section having a groove formed in its inner face at an angle to the side faces of said sections, and means attached to the ends of said sections for fastening them together.

3. A tool holder comprising two triangular sections, each section having a groove formed in its inner face at an angle to the side faces of said sections, L shaped attaching members, each of which has a longitudinal slot formed in the longer leg, screws passing through the shorter legs of said attaching members for fastening them to one of the sections, and other screws passing through the slots within the longer legs into the section, also for fastening them to one of said sections as shown and described.

4. In combination, a tool holder adapted to rest in the receiver of a tool post and be held in place by the tool post screw, said tool holder comprising a pair of triangular sections, the angular faces resting adjacent one another, each of said angular or inner faces having a groove formed therein at an angle to the side faces of the sections, a tool comprising a rectangular bar, each end having a cutting edge, said bar adapted to rest within the grooves, which, because of their position to the side walls of the sections, will give the tools the proper pitch and clearance, attaching members each having a rectangular aperture formed therein, the side walls of said aperture being produced at the angles to the edges of the attaching members, said apertures adapted to aline with the space between the sections, and means for fastening the attaching members to the sections.

5. A tool holder comprising two sections, each section having its inner face formed at an angle to its outer face and provided with a groove for running parallel with the angular face, and means attached to the ends of the sections for holding the latter together.

6. A tool holder consisting of two triangular sections, the inner face of each section having a groove therein running at an angle to the outer face of each section and from end to end, and means through which pass the ends of the tool carried by the holder for fastening the sections together.

7. A tool holder consisting of two triangular sections, the inner face of each section having a groove therein running at an angle to the outer face of each section and from end to end, the walls of said groove being formed at an angle to the faces of said sections, and means fastened to the end of one section and overlying the outer face of the adjacent section and attached thereto for holding said sections together.

8. As a new article of manufacture, a tool holder consisting of two sections, each section having an angular face in which is formed a groove, the side walls of said groove lying at an angle to the faces of the section, and means for holding said sections together.

In testimony whereof, I have hereunto affixed my signature in the presence of two subscribing witnesses.

JOSEPH G. BAKER.

Witnesses:
 EDW. W. AUSTIN,
 M. E. YOST.